F. BALTZER.
CAGE FOR ANTIFRICTION BEARINGS.
APPLICATION FILED MAR. 18, 1914.
1,095,694.
Patented May 5, 1914.
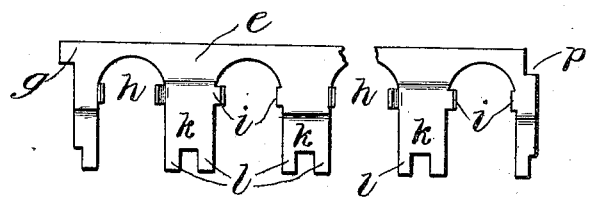
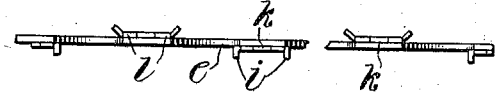
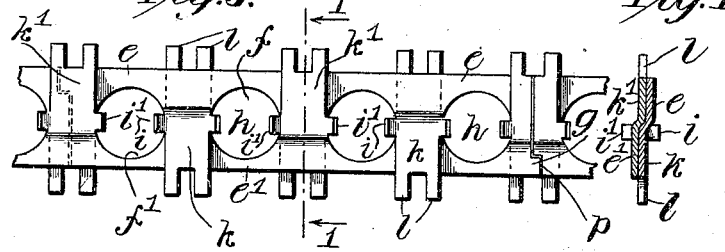
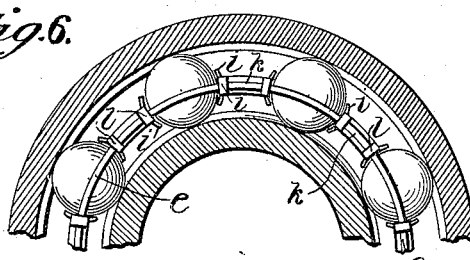
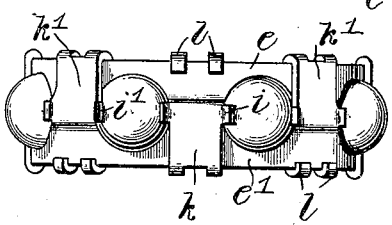
Attest:
Inventor:
Friedrich Baltzer
by Rogers, Kennedy & Campbell
Attys

UNITED STATES PATENT OFFICE.

FRIEDRICH BALTZER, OF BERLIN, GERMANY, ASSIGNOR TO DEUTSCHE WAFFEN- UND MUNITIONSFABRIKEN, OF BERLIN, GERMANY, A CORPORATION OF GERMANY.

CAGE FOR ANTIFRICTION-BEARINGS.

1,095,694.  Specification of Letters Patent.  Patented May 5, 1914.

Application filed March 18, 1914. Serial No. 825,452.

*To all whom it may concern:*

Be it known that I, FRIEDRICH BALTZER, a subject of the Emperor of Germany, residing at Berlin, Germany, have invented certain new and useful Improvements in Cages for Antifriction-Bearings, of which the following is a specification, reference being had therein to the accompanying drawing.

This invention relates to separators or cages for the rolling elements of antifriction bearings, adapted to be employed between the casing members of the bearing to maintain the rolling elements in spaced relations, and the invention has reference more particularly to that type of cage made up of annular connected sections provided in adjacent edges with recesses constituting seats or sockets for the rolling elements.

The invention has in view the production of a cage adapted for use more particularly in connection with antifriction bearings in which the rolling elements are in the form of balls, and the invention consists in an improved construction, comprising two annular sections disposed edge to edge and formed in adjacent edges with recesses conjointly constituting ball seats, said sections having lips projecting therefrom at the sides of the recesses, by which the balls are embraced and held.

The invention consists also in providing the annular sections between the recesses with tongues, those on one section being disposed alternately on opposite sides of the other section, the said tongues in order to admit of this arrangement being preferably offset laterally in opposite directions relatively to the body of the sections.

The invention consists also in extending the ends of the tongues of one section beyond the outer edge of the other section, and bending said tongues therearound to secure the sections together in operative relations.

The invention consists also in the details of construction and combination of parts hereinafter described and claimed.

In the accompanying drawings: Figure 1 is an elevation of one of the sections of the cage showing the same before it is bent into annular form; Fig. 2 is an edge view of the same; Fig. 3 is an elevation of a portion of the cage, showing the two annular sections assembled in operative relations preparatory to their being connected together; Fig. 4 is a vertical transverse sectional elevation on the line 1—1 of Fig. 3, viewed in the direction of the arrow in said figure; Fig. 5 is an elevation of the completely assembled cage with the balls retained therein; and Fig. 6 is a transverse section through a portion of an antifriction bearing, showing in elevation a portion of my improved cage therein.

Referring to the drawings: My improved cage comprises two annular sections $e$, $e'$, preferably of thin sheet material, which are provided in their edges with semicircular recesses $f$, $f'$ respectively, the recesses in one section being disposed opposite the recesses in the other section so that when said sections are disposed edge to edge as shown in Fig. 3, the opposing recesses will constitute conjointly circular openings or ball seats. Between the recesses, the annular sections are provided with tongues $k$, $k'$ respectively, the tongues on each section being offset laterally alternately in opposite directions relative to the body of the section, so that when the sections are disposed edge to edge as shown in Fig. 3, the tongues on each section will extend alternately on opposite sides of the other section, the two sections being firmly connected together in these relations by means of fingers 1 on the ends of the tongues which are bent down and around the outer edges of the sections as shown in Fig. 5. The sections are provided at opposite sides of the recesses therein, with lips $i$, $i'$ respectively, the lip on one side of a recess extending in a direction opposite the lip on the other side of said recess, this construction producing in effect, pairs of lips on each section, which pairs project alternately in opposite directions from the opposite sides of the section as shown more particularly in Fig. 2. In the assembled relation of the parts of the cage as shown in Figs. 5 and 6, the balls seated in the openings $h$, are embraced on opposite sides of their center by the oppositely extending lips, which serve to retain them in the holes while permitting of their free individual rotation.

In the formation of a cage of the construction described, two straight strips or sections of the form shown in Fig. 3 are provided and are each bent into circular form, assembled together edge to edge as shown in Fig. 3, the ends of the two sections being interlocked by the engagement of shoulders g on one of the ends of the sections, in recesses p in the other ends, this interlocking of the ends of the sections maintaining said ends against axial displacement relatively.

In the assemblage of the cage sections on the balls within the bearing, the two sections are inserted from opposite sides between the casing members of the bearing, the tongues of the two sections being passed between the balls, with the tongues on one section extending alternately on opposite sides of the other section. This operation will seat the opposing recesses around the balls, and will dispose the lips on opposite sides of the ball centers, after which the fingers 1 on the ends of the tongues are bent down around the outer edges of the sections as shown in Fig. 5, with the result that the parts of the cage will be firmly connected together edge to edge with the balls confined in the seats therein. In the event of it being desired to disassemble the cage, the fingers 1 are bent outwardly to the position shown in Fig. 3, whereupon the two sections may be separated and removed from the bearing. A cage of the construction described may be produced economically and expeditiously in large quantities by stamping the parts of the same from sheet metal stock. The sections are held together firmly without the necessity of riveting, soldering or like permanent connections, and may be conveniently assembled on the balls within the bearing, and as easily disassembled when occasion requires.

In the accompanying drawings I have shown my invention in the particular detailed form which I prefer to adopt, and which in practice has been found to answer to a satisfactory degree the objects sought, but it will be understood that these details may be variously changed and modified without departing from the spirit of my invention; and further it will be understood that the invention is not limited to any particular form or construction of the parts except in so far as such limitations are specified in the claims.

Having thus described my invention, what I claim is:

1. A cage for antifriction bearings, comprising annular sections disposed edge to edge and formed in adjacent edges with opposing recesses conjointly constituting ball seats, the said sections being provided between the recesses with axially extending flat tongues, said tongues being formed with ball-engaging lips and also with section-securing fingers, the said sections being so disposed that the tongues on each section will extend alternately on opposite sides of the other section.

2. A cage for antifriction bearings, comprising two annular flat sections disposed edge to edge and formed in adjacent edges with opposing recesses constituting ball seats, the said sections being provided between the recesses with axially extending flat tongues formed with ball-engaging lips, said tongues being also formed with fingers constituting means for maintaining said sections in connected operative relation, and said sections being so disposed that the tongues on each section will extend alternately on opposite sides of the other section flatly thereagainst.

3. A cage for antifriction bearings, comprising two annular flat sections disposed edge to edge and formed in adjacent edges with opposing recesses conjointly constituting ball seats, the said sections being provided between the recesses with axially extending flat tongues, and the said sections being so disposed that the tongues on each section will extend alternately on opposite sides of the other section flatly thereagainst, and means for maintaining said sections in connected operative relations.

4. A cage for antifriction bearings, comprising two annular flat sections disposed edge to edge and formed in adjacent edges with opposing recesses conjointly constituting ball seats, the said sections being provided between the recesses with tongues, those on each section being offset alternately in opposite directions from the plane of the section, and the said sections being so disposed that the said offset tongues of each section will extend flatly against the body portions of the other section, alternately on opposite sides of the same so as to dispose the body portions of the sections in a single axial plane, and means for maintaining said sections in connected operative relations.

In testimony whereof I have affixed my signature in presence of two witnesses.

FRIEDRICH BALTZER.

Witnesses:
 WOLDEMAR HAUPT,
 HENRY HASPER.